US012407979B2

(12) United States Patent
Wang et al.

(10) Patent No.: US 12,407,979 B2
(45) **Date of Patent: *Sep. 2, 2025**

(54) ENHANCING A LISTENING EXPERIENCE BY ADJUSTING PHYSICAL ATTRIBUTES OF AN AUDIO PLAYBACK SYSTEM BASED ON DETECTED ENVIRONMENTAL ATTRIBUTES OF THE SYSTEM'S ENVIRONMENT

(71) Applicant: Apple Inc., Cupertino, CA (US)

(72) Inventors: Paul X Wang, Cupertino, CA (US); Ivan S. Maric, Campbell, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/886,613

(22) Filed: Aug. 12, 2022

(65) Prior Publication Data

US 2022/0394378 A1 Dec. 8, 2022

Related U.S. Application Data

(63) Continuation of application No. 16/932,549, filed on Jul. 17, 2020, now Pat. No. 11,425,490, which is a continuation of application No. 16/355,128, filed on Mar. 15, 2019, now Pat. No. 10,735,854, which is a continuation of application No. 15/657,844, filed on Jul. 24, 2017, now Pat. No. 10,237,644.

(60) Provisional application No. 62/398,900, filed on Sep. 23, 2016.

(51) Int. Cl.

| | |
|---|---|
| ***H04R 1/34*** | (2006.01) |
| ***H04R 1/10*** | (2006.01) |
| ***H04R 1/28*** | (2006.01) |
| ***H04R 3/04*** | (2006.01) |
| ***H04R 29/00*** | (2006.01) |

(52) U.S. Cl.

CPC ........... *H04R 1/345* (2013.01); *H04R 1/1091* (2013.01); *H04R 1/2803* (2013.01); *H04R 3/04* (2013.01); *H04R 29/00* (2013.01); *H04R 2460/07* (2013.01)

(58) Field of Classification Search

CPC .... H04R 1/345; H04R 1/1091; H04R 1/2803; H04R 3/04; H04R 29/00; H04R 2460/07

USPC .................................... 381/56, 58, 124, 365

See application file for complete search history.

(56) References Cited

U.S. PATENT DOCUMENTS

2005/0249356 A1* 11/2005 Holmi ....................... H04S 7/30 381/86
2006/0109989 A1* 5/2006 Linhard ................. H04R 1/403 381/160
2010/0272271 A1 10/2010 Hayakawa et al.
2011/0044467 A1* 2/2011 Pompei .................... H04R 5/02 381/77
2012/0023468 A1 1/2012 Fischer et al.
2013/0182882 A1 7/2013 Hart et al.
(Continued)

OTHER PUBLICATIONS

Yeung, "Doppler Labs raises $24 million led by The Chernin Group for wireless listening system." Jul. 19, 2016, 4 pages, https://venturebeat.com/2016/07/19/doppler-labs-raises-24-million-led-by-the-chernin-group-for-wireless-listening-system/.

*Primary Examiner* — William A Jerez Lora
(74) *Attorney, Agent, or Firm* — Treyz Law Group, P.C.; Kendall P. Woodruff

(57) ABSTRACT

Systems, methods, and computer-readable media are provided for enhancing a user's listening experience by adjusting physical attributes of an audio playback system based on detected environmental attributes of the system's environment.

19 Claims, 7 Drawing Sheets

(56) References Cited

U.S. PATENT DOCUMENTS

| | | | | |
|---|---|---|---|---|
| 2015/0350804 | A1* | 12/2015 | Crockett | H04S 7/30<br>381/307 |
| 2015/0373475 | A1* | 12/2015 | Raghuvanshi | G10K 15/02<br>381/303 |
| 2015/0382123 | A1* | 12/2015 | Jobani | H04R 1/1016<br>700/98 |
| 2016/0014367 | A1 | 1/2016 | Yeo et al. | |
| 2016/0182990 | A1 | 6/2016 | Yamamoto | |
| 2017/0078810 | A1 | 3/2017 | Lee et al. | |
| 2017/0150254 | A1 | 5/2017 | Bakish et al. | |
| 2018/0014102 | A1* | 1/2018 | Hirsch | H04R 25/55 |
| 2020/0158866 | A1 | 5/2020 | Liu | |
| 2021/0385602 | A1 | 12/2021 | Po et al. | |

* cited by examiner

300

ENHANCING A LISTENING EXPERIENCE BY ADJUSTING PHYSICAL ATTRIBUTES OF AN AUDIO PLAYBACK SYSTEM BASED ON DETECTED ENVIRONMENTAL ATTRIBUTES OF THE SYSTEM'S ENVIRONMENT

CROSS-REFERENCE

This application is a continuation of patent application Ser. No. 16/932,549, filed Jul. 17, 2020, which is a continuation of patent application Ser. No. 16/355,128, filed Mar. 15, 2019, now U.S. Pat. No. 10,735,854, which is a continuation of patent application Ser. No. 15/657,844, filed Jul. 24, 2017, now U.S. Pat. No. 10,237,644, which claims the benefit of provisional patent application No. 62/398,900, filed Sep. 23, 2016, all of which are hereby incorporated by reference herein in their entireties.

FIELD

This generally relates to enhancing a listening experience and, more particularly, to enhancing a user's listening experience by adjusting physical attributes of an audio playback system based on detected environmental attributes of the system's environment.

BACKGROUND

Some user electronic devices may be operative to playback audio data for a listening user. However, the quality of the listening experience is often diminished by variables in the device's environment.

SUMMARY

Systems, methods, and computer-readable media are provided for enhancing a user's listening experience by adjusting physical attributes of an audio playback system based on detected environmental attributes of the system's environment.

As an example, a method of enhancing a listening experience of a user of an electronic device is provided that may include emitting sound waves from an audio output component of the electronic device using audio data electrical signals, detecting, with the electronic device, environmental attribute data indicative of an environmental attribute of an environment of the electronic device, processing the detected environmental attribute data, using the electronic device, to generate physical attribute adjustment data, and adjusting a physical attribute of the electronic device using the physical attribute adjustment data, wherein the physical attribute of the electronic device includes an orientation of the audio output component with respect to the environment, a position of a sound wave reflecting component with respect to the audio output component, a geometry of a sound wave passageway for the emitted sound waves, or a tautness of a membrane of the audio output component.

As an example, an electronic device is provided that may include a lower housing structure including an audio output component that emits sound waves into an environment of the electronic device, an upper housing structure including a display output component, a hinge structure coupling the lower housing structure to the upper housing structure, a sensor input component that detects environmental attribute data indicative of an environmental attribute of the environment of the electronic device, and a movement output component that adjusts the position of the upper housing structure with respect to the lower housing structure through rotation about the hinge structure based on the detected environmental attribute data for changing the reflection of the sound waves in the environment.

As yet another example, a product is provided that may include a non-transitory computer-readable medium and computer-readable instructions, stored on the computer-readable medium, that, when executed, are effective to cause a computer to detect environmental attribute data indicative of an environmental attribute of an ambient environment of the computer and adjust a physical attribute of the computer based on the environmental attribute data, wherein the physical attribute includes a position of an element of an audio output component of the computer with respect to the ambient environment of the computer, and wherein the environmental attribute includes geometry of the ambient environment, location of the user with respect to the audio output component, geometry of an ear of the user, and otoacoustic emission of an ear of the user.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

Systems, methods, and computer-readable media for enhancing a user's listening experience by adjusting physical attributes of an audio playback system based on detected environmental attributes of the system's environment are provided and described with reference to FIGS. 1-5.

Figure 1:
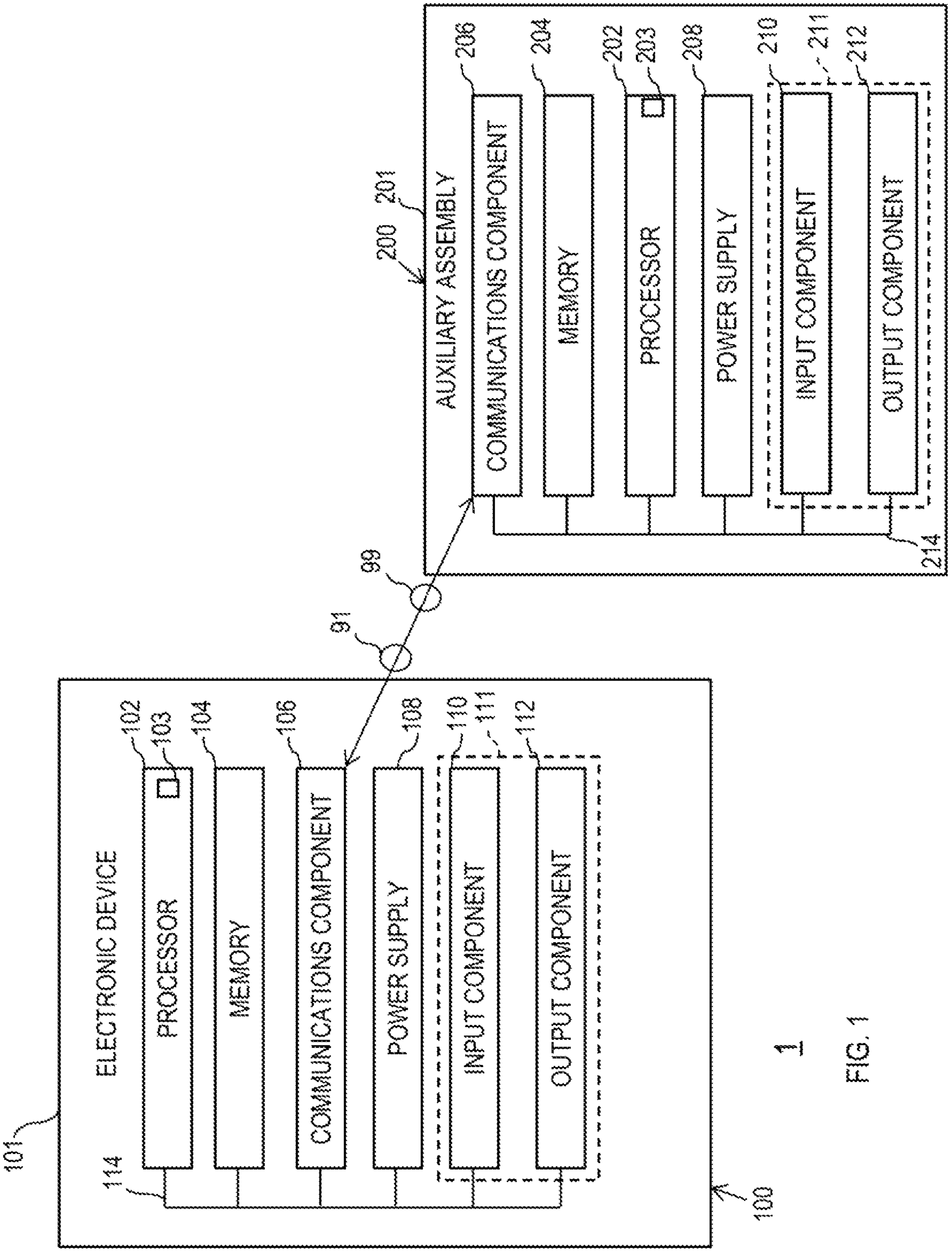
FIG. 1 is a schematic view of an illustrative audio playback system with an electronic device and at least one auxiliary assembly.
Figure 2:
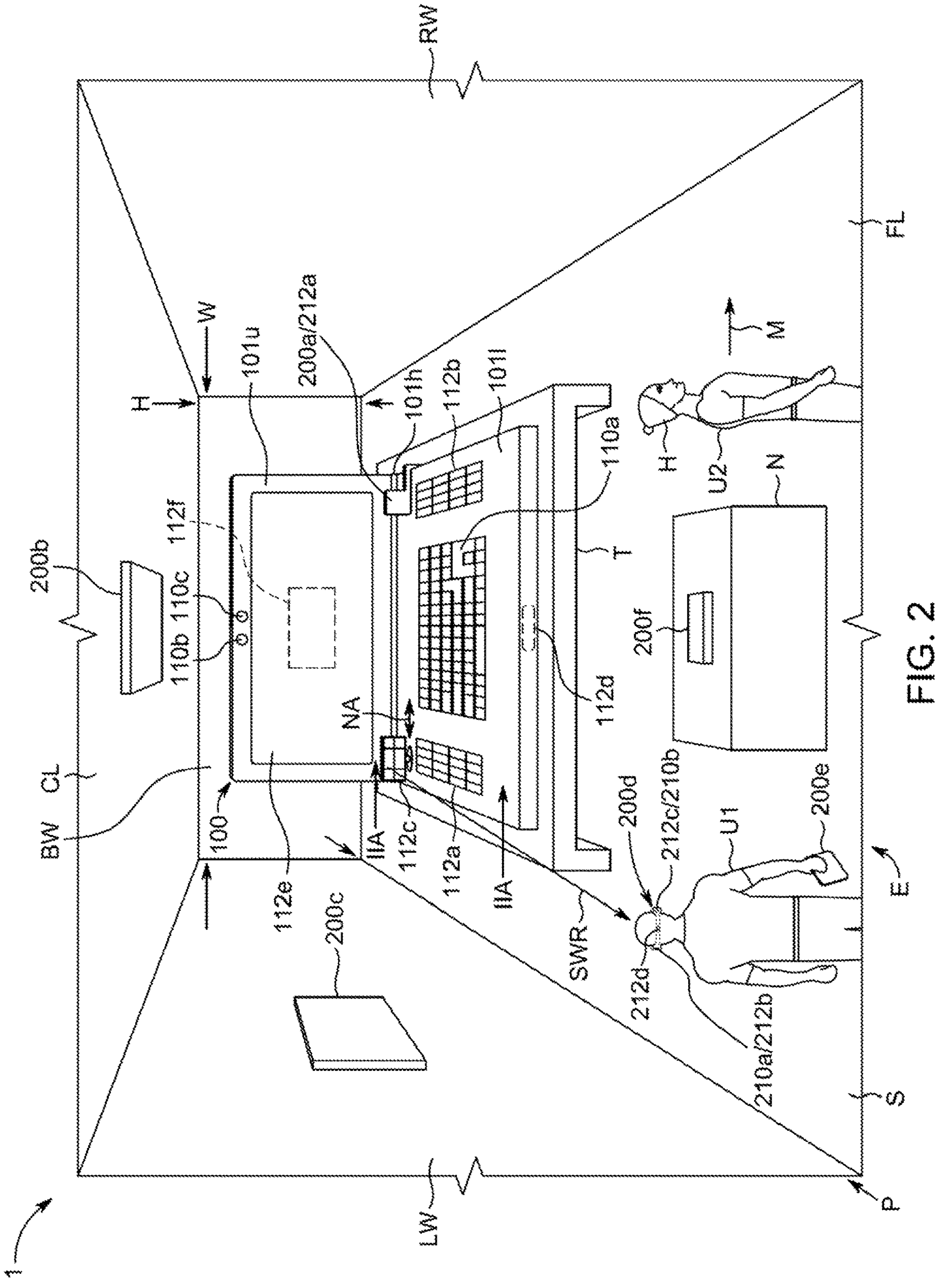
FIG. 2 is a perspective view of an exemplary electronic device and multiple auxiliary assemblies of the system of FIG. 1 in a particular system environment.
Figure 2A:
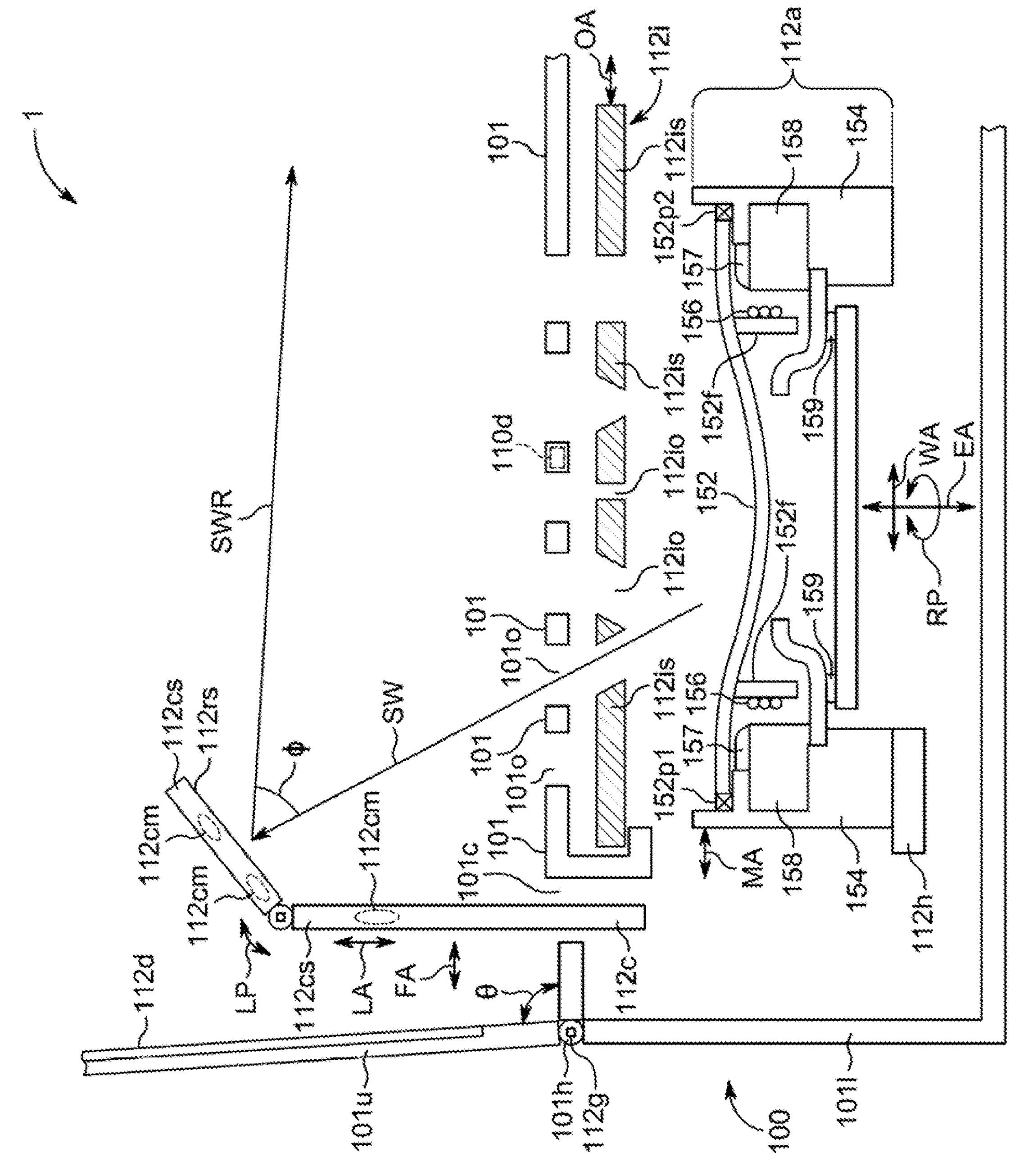
FIG. 2A is a cross-sectional view, taken from line IIA-IIA of FIG. 2, of a portion of the system of FIGS. 1 and 2.

FIG. 1 is a schematic view of an illustrative system 1 with an electronic device 100 and at least one auxiliary assembly 200, while FIGS. 2 and 2A are various views of a particular system 1 implemented within a particular environment E. Electronic device 100, on its own or in cooperation with one or more auxiliary assemblies 200, may be configured to detect various environmental attributes of the current environment of system 1 and to adjust various physical system attributes of system 1 based on the detected environmental attributes before or while a sound wave emitting subassembly of electronic device 100 emits sound waves into the environment of system 1, where such physical system attribute adjustment may enhance the experience of a system user listening to the emitted sound waves.

System 1 may be configured to detect any suitable environmental attributes of a current environment of system 1, including, but not limited to, the geometry (e.g., size and/or shape) of a room or defined space of the environment, the location and/or orientation of one or more system users within the environment relative to the sound wave emitting subassembly of device 100 (e.g., distance of a user from sound wave emitting subassembly and/or orientation of the ears with respect to the sound wave emitting subassembly), the specific identity or class identity of one or more system users within the environment, the geometry (e.g., size and/or shape) and/or the exposition of the ears of one or more system users within the environment relative to the sound wave emitting subassembly of device 100, the otoacoustic emissions (e.g., spontaneous otoacoustic emissions and/or evoked otoacoustic emissions) of the ears of one or more system users within the environment, the ambient noise level or other audio qualities of the environment distinct from any sound waves emitted by system 1, any audio qualities of the environment including the sound waves emitted by system 1, and/or the like. Electronic device 100 and/or any auxiliary assembly 200 of system 1 may include any suitable input component(s) (e.g., environmental attribute sensor input component(s)) that may be operative to detect any suitable environmental attribute of the environment of system 1 (e.g., cameras, ultrasonic sensors, infrared light sensors, microphones, temperature sensors, etc.) and/or may include any suitable communication component that may be operative to receive any suitable data indicative of any suitable environmental attribute of the environment of system 1 from any suitable remote data source (e.g., a data server (not shown) that may be operative to share data indicative of any suitable architectural characteristics of the environment and/or data indicative of a particular user's ear structure or preferred audio equalization settings).

Before or while a sound wave emitting subassembly (e.g., any suitable transducer or driver that may be operative to receive audio data electrical signals and convert or transduce the received electrical signals into corresponding sound waves) of electronic device 100 may emit sound waves into the environment of system 1, system 1 may be configured to adjust, based on any detected environmental attributes of the environment of system 1, any suitable physical system attributes of system 1, including, but not limited to, the orientation of any element(s) of the sound wave emitting subassembly of device 100 with respect to any element(s) of the environment (e.g., the ears of a system user) in any one or more degrees of freedom (e.g., about any one or more axes of a three-dimensional Cartesian coordinate system for the environment), the geometry (e.g., size and/or shape) of any element(s) of the sound wave emitting subassembly of device 100, the location and/or orientation of any suitable sound wave reflecting component of device 100 and/or of any auxiliary assembly 200 relative to the sound wave emitting subassembly of device 100 and/or relative to any element(s) of the environment (e.g., the ears of a detected system user), the magnitude of any suitable movement (e.g., vibration, force, movement, actuator stroke, etc.) of any suitable movement output component, such as a movement output component embedded within or coupled to a sound wave reflecting component of device 100 and/or of any auxiliary assembly 200, and/or the like. In some embodiments, adjustment of one or more physical system attributes of system 1 may be based not only on any detected environmental attribute(s) of the environment of system 1 but also on any suitable characteristics of the sound waves emitted into the environment of system 1 by the sound wave emitting subassembly of device 100. Any physical system attribute adjustment may be made by system 1 to enhance the experience of a system user listening to the sound waves emitted by the sound wave emitting subassembly of device 100. Electronic device 100 and/or any auxiliary assembly 200 of system 1 may include any suitable output component(s) (e.g., physical or mechanical output components) that may be operative to be moved for adjusting any suitable physical system attributes of system 1 (e.g., sound reflecting surfaces, motors, piezoelectric actuators, etc.).

Electronic device 100 of system 1 may be any portable, wearable, mobile, or hand-held electronic device configured to emit sound waves, detect environmental attributes of its environment, and/or adjust physical attributes of system 1 to enhance a user's experience listening to the emitted sound waves. Alternatively, electronic device 100 may not be portable at all, but may instead be generally stationary. Electronic device 100 can include, but is not limited to, an audio player, game player, other media player, radio, medical equipment, domestic appliance, transportation vehicle instrument, musical instrument, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., audio (e.g., music) and image and other media files), software (e.g., applications for implementing functions on device 100 (e.g., media playback applications and system environment processing applications)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more auxiliary assemblies (e.g., assembly 200 of FIG. 1 and/or any one or more of assemblies 200*a*-200*f* of FIGS. 2 and 2A)) using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be electrically coupled to another device or server or subsystem (e.g., one or more auxiliary assemblies 200) and communicate with that other device, either wirelessly or via a wired connection (e.g., directly or via any suitable intermediate communication set-ups (e.g., servers, routers, towers, etc.)).

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 (e.g., to provide any suitable user control data) and/or to detect any suitable environmental attributes of the environment of system 1 certain information about the ambient environment. For example, input component 110 can take a variety of forms, including, but not limited to, a touch pad, trackpad, dial, click wheel, scroll wheel, touch screen, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a three-dimensional scanner that may identify the three-dimensional geometry (e.g., shape and/or size) of any suitable structure (e.g., the ear of a user), a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), ultrasonic sensor, thermal and/or temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), acoustic sensor, sonic or sonar sensor, radar sensor, image sensor, video sensor, any suitable device locating subsystem or global positioning system ("GPS") detector or subsystem, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

One or more output components 112 may be provided to present information (e.g., graphical, audible, and/or tactile information) to a user of device 100 and/or to adjust any physical system attribute of system 1. For example, output component 112 can take a variety of forms, including, but not limited to, a sound wave emitting subassembly (e.g., any suitable transducer or driver subassembly that may be operative to receive audio data electrical signals (e.g., of an audio or other suitable media file or streamed data that may be accessible to device 100) and to convert or transduce the received electrical signals into corresponding sound waves), a sound wave reflecting subassembly (e.g., any suitable physical or mechanical sound wave reflecting component(s) that may be operative to reflect sound waves in any suitable manner) that may be moved in one or more directions (e.g., with respect to a sound wave emitting subassembly), any suitable physical or mechanical movement output component that may be operative to be moved for adjusting any suitable physical system attribute(s) of system 1 (e.g., motors, piezoelectric actuators, etc.) and that may be embedded within or coupled to a sound wave reflecting component or any other suitable component of device 100, data and/or power line-out, visual display (e.g., for transmitting data via visible light and/or via invisible light), antenna, infrared port, flash (e.g., light sources for providing artificial light for illuminating an environment of the device), tactile/haptic component (e.g., rumblers, vibrators, etc.), taptic component (e.g., components that are operative to provide tactile sensations in the form of vibrations), and any combinations thereof.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen that may receive input information through a user's touch of a display screen and that may also provide visual information to a user via that same display screen, or such as a transducer that may receive audio input information from a user when operating as a microphone and that may provide audio information to a user when operating as a speaker.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, media playback applications and/or environmental attribute processing applications and/or physical system attribute adjustment applications (e.g., a combined listening enhancement application), media editing applications, pass applications, calendar applications, state determination applications (e.g., device state determination applications, auxiliary assembly state determination applications), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 and/or via any other component of device 100 (e.g., environmental attribute data or auxiliary assembly state/capability data from any auxiliary assembly 200 via communications component 106, etc.) may manipulate the one or more ways in which information may be stored on device 100 (e.g., in memory 104) and/or in which information may be provided to a user and/or in which physical system attributes may be adjusted via an output component 112 and/or in which auxiliary assembly control data may be provided to a remote subsystem (e.g., to one or more auxiliary assemblies 200 via communications component 106). Application 103 may be accessed by processor 102 from any suitable source, such as from memory 104 (e.g., via bus 114) or from another device or server (e.g., from auxiliary assembly 200 via communications component 106 and/or from any other suitable remote data source (e.g., remote data server) via communications component 106). Electronic device 100 (e.g., processor 102, memory 104, or any other components available to device 100) may be configured to process data and/or generate commands at various resolutions, frequencies, and various other characteristics as may be appropriate for the capabilities and resources of device 100. Processor 102 may include a single processor or multiple processors. For example, processor 102 may include at least one "general purpose" microprocessor, a combination of general and special purpose microprocessors, instruction set processors, audio processing units or sound cards, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, processor 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Auxiliary assembly 200 may be any suitable assembly that may be configured to detect any suitable environmental attributes of the environment of system 1 and/or adjust any suitable physical system attributes of assembly 200. Auxiliary assembly 200 may include any suitable control circuitry or processor 202, which may be similar to any suitable processor 102 of device 100, application 203, which may be similar to any suitable application 103 of device 100, memory 204, which may be similar to any suitable memory 104 of device 100, communications component 206, which may be similar to any suitable communications component 106 of device 100, power supply 208, which may be similar to any suitable power supply 108 of device 100, input component 210, which may be similar to any suitable input component 110 of device 100, output component 212, which may be similar to any suitable output component 112 of device 100, I/O interface 211, which may be similar to any suitable I/O interface 111 of device 100, bus 214, which may be similar to any suitable bus 114 of device 100, and/or housing 201, which may be similar to any suitable housing 101 of device 100. In some embodiments, one or more components of auxiliary assembly 200 may be combined or omitted. Moreover, auxiliary assembly 200 may include other components not combined or included in FIG. 1. For example, auxiliary assembly 200 may include any other suitable components or several instances of the components shown in FIG. 1. For the sake of simplicity, only one of each of the components is shown in FIG. 1. Auxiliary assembly 200 may be operative to communicate any suitable data 91 (e.g., environmental attribute data detected by auxiliary assembly 200 (e.g., by any input component 210 of auxiliary assembly 200) and/or data indicative of the current state of any components/features of auxiliary assembly 200 and/or data indicative of any functionalities/capabilities of auxiliary assembly 200) from communications component 206 to communications component 106 of electronic device 100 using any suitable communication protocol(s), while electronic device 100 may be operative to communicate any suitable data 99 (e.g., auxiliary assembly control data operative to adjust any physical system attributes of auxiliary assembly 200 (e.g., of any output component(s) 212 of auxiliary assembly 200)) from communications component 106 to communications component 206 of auxiliary assembly 200 using any suitable communication protocol(s).

FIGS. 2 and 2A show system 1 implemented within a particular environment E, where system 1 may include electronic device 1 and various auxiliary assemblies 200*a*-200*f*, each of which may be similar to auxiliary assembly 200 and may include some or all of the components and/or functionality of assembly 200 of FIG. 1. As shown, environment E may include a space S at least partially defined by a back wall BW, a front wall (not shown), a left wall LW, a right wall RW, a floor FL, and a ceiling CL, where space may have a height H, a width W, and a depth P. Within space S, environment E may include a table T and other furniture N on floor FL, where electronic device 100 may be positioned on a top surface of table T. Moreover, as shown, environment E may include a first user U1 and a second user U2 within space S. It is to be appreciated that various elements of system 1 and/or environment E may not be to scale in FIG. 2 in order to clearly show certain features thereof. Assemblies 200*a*-200*f* may be positioned in any suitable manner throughout environment E, such as, for example, assembly 200*a* may be positioned about a side of electronic device 100, assembly 200*b* may be coupled to ceiling CL, assembly 200*c* may be coupled to left wall LW, assembly 200*d* may be worn by user U1, assembly 200*e* may be held by user U1, and assembly 200*f* may be resting on a top surface of furniture N but may be coupled to or configured as a drone or other suitable unmanned vehicle that may be moved or otherwise physically adjusted to any suitable position within space S.

As shown in FIGS. 2 and 2A, device 100 may be presented as a laptop or notebook personal computing device as an example only, while many other electronic devices (with or without displays) are envisioned. However, in FIGS. 2 and 2A, device 100 may include a "clamshell" form factor with a lower housing 101*l*, an upper housing 101*u*, and a hinge housing 101*h* that may rotatably couple lower housing 101*l* with upper housing 101*u*. Lower housing 101*l* may provide support for any suitable components, such as a left or first sound wave emitting subassembly output component 112*a*, a right or second sound wave emitting subassembly output component 112*b*, a sound wave reflecting output component 112*c*, a movement output component 112*d* (e.g., a piezoelectric actuator), and a keyboard input component 110*a*. Upper housing 101*u* may provide support for any suitable components, such as a camera input component 110*b*, a microphone input component 110*c*, a display output component 112*e*, and a movement output component 112*f* (e.g., a piezoelectric actuator). Camera input component 110*b* and/or any other suitable sensing input components of device 100 and/or of any auxiliary assembly of system 1 may be operative to detect any suitable environmental attributes of environment E, such as the geometry (e.g., size and/or shape) of space S of environment E (e.g., height H, width W, and/or depth P), the location and/or orientation of user U1 and/or user U2 within environment E relative to sound wave emitting subassembly output component 112*a* and/or sound wave emitting subassembly output component 112*b* of device 100 (e.g., user U1 proximate and facing output component 112*a* and user U2 proximate yet facing away from output component 112*b* (e.g., in the direction M)), the specific identity or class identity of user U1 and/or user U2 within environment E, the geometry (e.g., size and/or shape) of the ears of user U1 and/or of user U2 (e.g., a three dimensional scan of the concha or other features of an ear that affect the frequency response of the ear) and/or the exposition of the ears of user U1 and/or of user U2 (e.g., the lack of exposition of the ears of user U2 due to user U2 wearing a winter hat H over the user's ears), and/or the like. Microphone input component 110*c* and/or any other suitable sensing input components of device 100 and/or of any auxiliary assembly of system 1 may be operative to detect any suitable environmental attributes of environment E, such as the otoacoustic emissions (e.g., spontaneous otoacoustic emissions and/or evoked otoacoustic emissions) of the ears of user U1 and/or user U2, the ambient noise level or other audio qualities of environment E distinct from any sound waves emitted by sound emitting subassembly output component 112*a* and/or by sound emitting subassembly output component 112*b*, any audio qualities of environment E including any sound waves emitted by system 1 (e.g., emitted sound wave SW and/or reflected sound wave SWR or any other sound waves within environment E), and/or the like.

Hinge housing 110*h* may provide support for any suitable components, such as a movement output component 112*g*, which may be operative to rotatably adjust (e.g., automatically without physical user interaction) the position of upper housing 101*u* with respect to lower housing 101*l* (e.g., to adjust the magnitude of angle θ therebetween) such that one or more surfaces of at least a portion of upper housing 110*h* and/or display output component 112*e* or otherwise may also be operative to function as a sound wave reflecting subassembly for reflecting sound waves emitted from sound wave emitting subassembly output component 112*a* and/or from sound wave emitting subassembly output component 112*b* in any suitable direction (e.g., a magnitude of rotatable adjustment of the position of upper housing 101*u* with respect to the position of lower housing 101*l* and sound wave emitting subassembly output components 112*a* and 112*b* by movement output component 112*g* may be a physical system attribute that may be adjusted for enhancing a user's listening experience).

As shown in FIGS. 2 and 2A, sound wave emitting subassembly output component 112*a* may provide any suitable transducer or driver that may be operative to receive audio data electrical signals (e.g., from processor 102), to convert or transduce the received electrical signals into corresponding sound waves, and to emit the sound waves (e.g., sound waves SW) out from housing 101 through one or more audio housing openings 1010 and into environment E such that the sound waves (or reflections thereof (e.g., reflected sound waves SWR)) may be received at an eardrum of user U1 and/or user U2. As shown in FIG. 2A, sound wave emitting subassembly output component 112*a* may include a flexible diaphragm or membrane 152 that may be coupled at an outer periphery to a frame 154 and may include a former 152*f* at one or more intermediate positions with a moving coil 156 coupled thereto. A permanent magnet 158 may be positioned about moving coil 156, for example, using frame 154, at least one washer 157, and a t-yoke 159. The audio data electrical signals may be passed through coil 156 so as to generate an electromagnetic field that may produce an electromagnetic force that may be opposed by the main permanent magnetic field generated by permanent magnet 158 such that coil 156 may move membrane 152, which may cause a disturbance in the air around membrane 152 for producing sound waves. At least some of these sound waves SW may be emitted through at least one audio housing opening 1010 of housing 101. Therefore, membrane 152 may be operative to move in a magnetic gap for vibrating and producing sound waves. Membrane 152 may be any suitable shape and size, but may be a thin, semi-rigid but flexible structure. In some particular embodiments, membrane 152 may be a laminate or other suitable combination of multiple layers or films of materials stacked on top of one another to provide a composite structure that may be operative to provide or otherwise enable the tonality desired for sound wave emitting subassembly output component 112*a* to generate a target sound.

As also shown in FIG. 2A, electronic device 100 may include a movement output component 112*h* coupled to sound wave emitting subassembly output component 112*a*, such as to a portion of frame 154, where movement output component 112*h* may be any suitable motor(s) or other suitable movement component(s) that may be operative to adjust any suitable physical attribute of sound wave emitting subassembly output component 112*a* (e.g., a physical attribute other than that which may be adjusted by the audio data electrical signals passed through coil 156 for generating the sound waves to be emitted). For example, movement output component 112*h* may receive any suitable physical system attribute adjustment data (e.g., from processor 102) that may be operative to control movement output component 112*h* to adjust the position and/or geometry of any suitable element (s) of sound wave emitting subassembly output component 112*a*, such as moving the entirety of sound wave emitting subassembly output component 112*a* up or down along an axis EA (e.g., to move sound wave emitting subassembly output component 112*a* towards or away from housing opening 1010 of housing 101), moving the entirety of sound wave emitting subassembly output component 112*a* left or right along axis WA (e.g., to move sound wave emitting subassembly output component 112*a* adjacent housing opening 1010 of housing 101), rotating the entirety of sound wave emitting subassembly output component 112*a* in either direction about axis EA (e.g., along path RP) or about axis WA or about another axis NA perpendicular to axes EA and WA, or the like, such that the entirety of sound wave emitting subassembly output component 112*a* may be moved in any suitable manner with respect to housing opening 1010 of housing 101 for adjusting the orientation of any elements (e.g., membrane 152) with respect to housing opening 1010 and ambient environment E (e.g., user U1). Alternatively or additionally, movement output component 112*h* may receive any suitable physical system attribute adjustment data (e.g., from processor 102) that may be operative to control movement output component 112*h* to adjust the position and/or geometry of certain element(s) of sound wave emitting subassembly output component 112*a* with respect to other elements of sound wave emitting subassembly output component 112*a*, which may adjust an audio output characteristic of sound wave emitting subassembly output component 112*a*, such as by moving outer periphery portion 152*p*1 of membrane 152 towards or away from outer periphery portion 152*p*2 of membrane 152 along axis MA for tightening or loosening membrane 152 (e.g., for adjusting the tautness of membrane 152 (e.g., the tautness of the sound wave generating element of output component 112*a*)).

As also shown in FIG. 2A, electronic device 100 may include a movement output component/sound wave reflecting output component 112*i* that may be operative to move a structure 112*is* with respect to housing 101 for adjusting the shape and/or size and/or number of audio housing openings 1010 through which sound waves emitted by sound wave emitting subassembly output component 112*a* may be able to travel. For example, structure 112*is* may be moved in either direction along an axis OA for aligning each opening 1010 with a sound blocking portion of structure 112*is* or with an audio structure opening 112*io* through structure 112*is*, where such alignment may either reduce the size of an audio housing opening 1010 through which sound waves may travel, taper or angle an orientation of an audio housing opening 1010 through which sound waves may travel (e.g., provide an angle to a passageway provided by a combination of an opening 112*io* and an opening 1010), or block an audio housing opening 101*o*. Therefore, the geometry of structure 112*is* and its openings 112*io* and the position of structure 112*is* (e.g., along axis OA) with respect to openings 1010 of housing 101 may be operative to adjust not only one or more physical system attributes of structure 112*is* (e.g., its position within housing 101) but also one or more physical system attributes of sound wave emitting subassembly output component 112*a* (e.g., its geometry of sound wave passageways for emitting sound waves).

Figure 4:
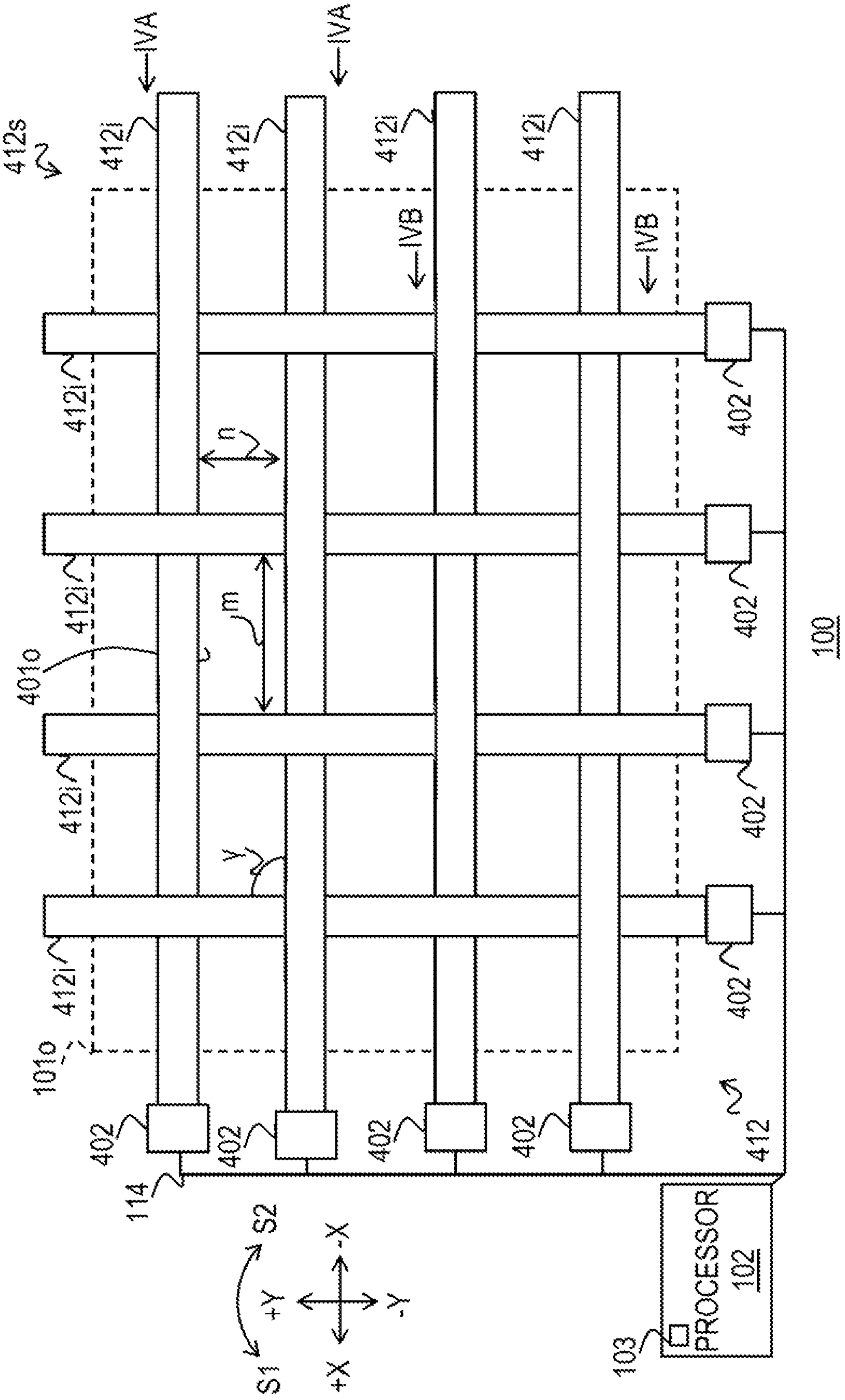
FIG. 4 is a view of a portion of the device of the system of FIGS. 1, 2, and 2A.

Additionally or alternatively, as shown in FIG. 4, electronic device 100 may include a movement output component/sound wave reflecting output component 412 that may be operative to adjust a geometry of a speaker grill structure 412*s* of speaker grill elements 412*i* that may be positioned above and/or under and/or within one or more audio housing openings 1010 for adjusting the shape and/or size and/or position of one or more structure openings 4010 between adjacent elements 412*i* through which sound waves emitted by sound wave emitting subassembly output component 112*a* may be able to travel for eventual receipt by one or more users. For example, structure 412*s* may be a structure of any suitable number and arrangement of elements 412*i* that may be operative to at least partially cover one or more audio housing openings 1010 for protecting sound wave emitting subassembly output component 112*a* from debris or other potentially harmful forces in the environment of device 100. As a particular example, as shown in FIG. 4, structure 412*s* may include a four by four array of perpendicularly interlaced elements 412*i* (e.g., an orthogonal mesh), although it is to be understood that any suitable number of elements 412*i* may be provided in any suitable arrangement (e.g., crossing elements may not be interlaced over-under-over-under, as shown, but may be interlaced in any other suitable arrangement or may not be interlaced but may be laid on top of one another (e.g., all horizontal elements on top of all vertical elements, etc.). One, some, or each element 412*i* may be made of any suitable material, such as metal, glass, rubber, polymer, fiber, and/or the like. One, some, or each element 412*i* of structure 412*s* may be coupled to an element adjustment component 402 of output component 412, and each element adjustment component 402 may be controllable by processor 102 (e.g., via any suitable signals that may be communicated therebetween (e.g., via bus 114)). An element adjustment component 402 may be controllable to adjust a shape, a size, and/or a position of an associated element 412*i* of structure 412*s*, which may adjust a shape, a size (e.g., dimension n), and/or a position of one or more structure openings 4010 that may be adjacent to and at least partially defined by the adjusted element 412*i*.

Figure 4B:
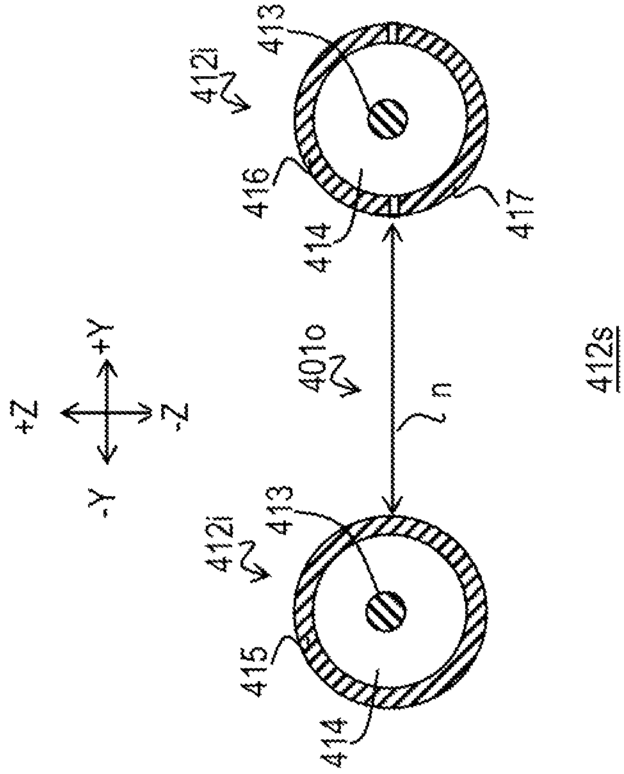
FIG. 4B is a cross-sectional view, taken from line IVB-IVB of FIG. 4, of a portion of the device of FIGS. 1, 2, 2A, and 4.
Figure 4A:
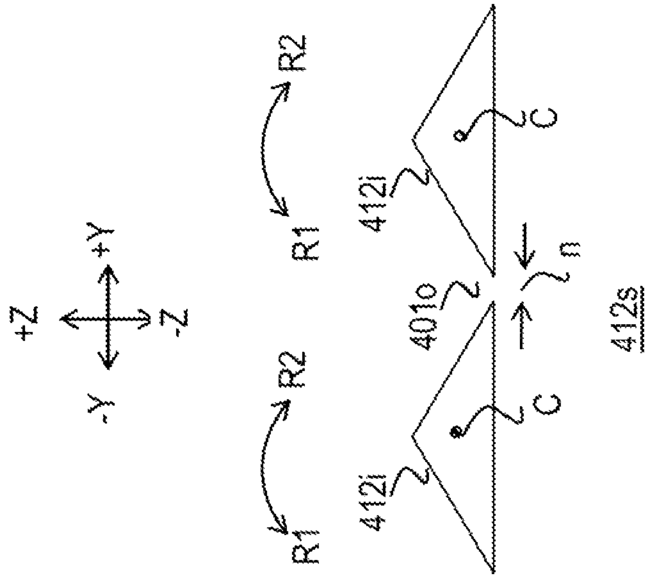
FIG. 4A is a cross-sectional view, taken from line IVA-IVA of FIG. 4, of a portion of the device of FIGS. 1, 2, 2A, and 4.

Adjustment component(s) 402 may be controlled to move one or more elements 412*i* with respect to one or more other elements 412*i* within structure 412*s* for adjusting any suitable physical characteristic of one or more openings 401*o*. For example, an adjustment component 402 may receive any suitable physical system attribute adjustment data (e.g., from processor 102) that may be operative to control that adjustment component 402 to adjust the position of its associated element 412*i* in any suitable manner, such as by moving the entirety or at least a portion of element 412*i* in the +X direction or the −X direction along an X-axis (e.g., to move a vertical element closer to or farther away from an adjacent vertical element (e.g., for adjusting a dimension m of one or more openings 401*o*)), moving the entirety or at least a portion of element 412*i* in the +Y direction or the −Y direction along a Y-axis (e.g., to move a horizontal element closer to or farther away from an adjacent horizontal element (e.g., for adjusting a dimension n of one or more openings 401*o*)), moving the entirety or at least a portion of element 412*i* in the +Z direction or the −Z direction along a Z-axis (e.g., to pull portions of an interlaced mesh closer to or farther away from output component 112*a* and/or opening(s) 101*o*), rotating the entirety or at least a portion of element 412*i* in the S1 direction or the S2 direction about the Z-axis (e.g., to adjust the angular orientation of two or more elements (e.g., for adjusting the size of an angular dimension y between crossing elements)), rotating the entirety or at least a portion of element 412*i* in the R1 direction or the R2 direction about the X-axis (e.g., to adjust the angular orientation of elements (e.g., rotating a horizontal element 412*i* about its center C for adjusting the size of dimension n of opening 4010 between elements when a cross-sectional shape of one or more of the elements is non-circular (e.g., an isosceles triangle, as shown in FIG. 4A, or any other suitable shape that may adjust dimension n when rotated about center C))), adjusting the tension between ends of element 412*i*, and/or the like, for adjusting any suitable physical characteristic of one or more openings 401*o*, where adjustment component 402 may be any suitable motor(s) and/or any other suitable mechanisms that may physically move an associated element 412*i* with respect to one or more other elements 412*i* and/or opening(s) 1010 and/or output component 112. Additionally or alternatively, an adjustment component 402 may receive any suitable physical system attribute adjustment data (e.g., from processor 102) that may be operative to control that adjustment component 402 to adjust a cross-sectional geometry of its associated element 412*i* in any suitable manner, such as by expanding or contracting a cross-sectional area of a horizontal element 412*i* (e.g., in a Y-Z plane) by inflating or deflating a hollow portion of the element (e.g., with water or air or any other suitable fluid) and/or by adjusting an electrical field stimulating the element, and/or the like, for adjusting any suitable physical characteristic of one or more openings 4010 adjacent the element with the manipulated cross-section. As one particular example, as shown in FIG. 4B, an element 412*i* may include an electrically conductive wire 413 extending along at least a portion of the length of the element that may be at least partially surrounded by an elastic material 414 (e.g., a low durometer silicone), which may be at least partially surrounded by an electrically conductive layer 415 (e.g., silver ink), such that when an electric field (e.g., differential charge) may be provided by component 402 via wire 413 and layer 415 to material 414, material 414 may expand or contract, thereby changing the cross-sectional geometry of element 412*i* (e.g., material 414 may be used as an electroactive polymer). In some embodiments, as also shown in FIG. 4B, two or more conductive layers 416 and 417 may be provided about different portions of material 414 of an element 412*i*, such that different charges may be applied to different ones of layers 416 and 417 for adjusting the cross-sectional shape of element 412*i* in various ways (e.g., such that the top half of the cross-sectional shape may not expand as much as the bottom half of the cross-sectional shape, such that the cross-sectional shape may be adjusted from a circular cross-sectional shape to a more triangular or other suitable shape, which may or may not be rotated as described with respect to FIG. 4A or otherwise moved with respect to one or more other elements 412*i*), which may adjust the size and/or shape and/or taper angle of any opening 4010 of a sound wave passageway of device 100. Therefore, the geometry of structure 412*s* and its openings 4010 and the position of elements 412*i* of structure 412*s* with respect to opening(s) 1010 of housing 101 may be operative to adjust not only one or more physical system attributes of structure 412*s* (e.g., the position of structure 412*s* within housing 101 and/or the relative position and/or size and/or shape and/or orientation of different elements 412*i* of structure 412*s*) but also one or more physical system attributes of sound wave emitting subassembly output component 112*a* (e.g., its geometry of sound wave passageways 4010 for emitting sound waves from device 100 into the environment).

As also shown in FIGS. 2 and 2A, electronic device 100 may include movement output component/sound wave reflecting output component 112*c* that may be operative to move one or more structures 112*cs* with respect to housing 101 for adjusting the location and/or orientation and/or position of one or more sound reflecting surfaces of structure(s) 112*cs* relative to sound wave emitting subassembly output component 112*a*, which may adjust the manner in which any sound waves emitted by sound wave emitting subassembly output component 112*a* may be reflected by sound wave reflecting output component 112*c* (e.g., adjust how sound wave SW may be reflected by a reflecting surface 112*rs* of at least one structure 112*cs* of output component 112*c* as reflected sound wave SWR (e.g., adjust angle 1 of the reflection)). Various structures 112*cs* and/or reflective surfaces of output component 112*c* may be moved in any suitable manner (e.g., in any one or more degrees of freedom) with respect to output component 112*a* (e.g., along a path LP about a hinge axis of component 112*c* or in any direction along axis LA or axis FA or an axis NA perpendicular to axes LA and FA) for positioning one or more reflective surfaces in any suitable manner for any suitable reflection of sound waves (e.g., as determined by any suitable physical system attribute adjustment data received by component 112*c* from processor 102). It is to be appreciated that component 112*c* may be configured to selectively be retracted into housing 101*l* (e.g., through housing opening 101*c*) for hiding component 112*c* when not in use.

As also shown, one or more reflective structures 112*cs* of component 112*c* may have embedded therein or otherwise coupled thereto one or more discrete movement output components 112*cm* (e.g., a piezoelectric actuator), where each one of such movement output components 112*cm* may be independently controlled (e.g., by any suitable physical system attribute adjustment data received processor 102) to adjust the magnitude of a discrete movement of the movement component (e.g., a discrete vibration, etc.) that may be operative to affect any sound wave(s) reflecting off of the reflective structure 112*cs* associated with the movement component. Similarly, movement component 112*f* of device 100 (e.g., behind display output component 112*e*) may be one or more discrete movement output components (e.g., a piezoelectric actuator), where each one of such movement output components may be independently controlled (e.g., by any suitable physical system attribute adjustment data received processor 102) to adjust the magnitude of a discrete movement of the movement component (e.g., a discrete vibration, etc.) that may be operative to affect any sound wave(s) reflecting off of a reflective surface associated with the movement component (e.g., a surface of display output component 112*e*). Similarly, movement component 112*d* of device 100 (e.g., within housing structure 1011) may be one or more discrete movement output components (e.g., a piezoelectric actuator) that may be independently controlled (e.g., by any suitable physical system attribute adjustment data received processor 102) to adjust the magnitude of a discrete movement of the movement component (e.g., a discrete vibration, etc.) that may be operative to affect any sound wave(s) emitted by output component 112*a* and/or to vibrate against table T for supplementing any sound wave(s) emitted by output component 112*a*. Additionally, as shown, housing 101*l* may include a microphone input component 110*d* and/or any other suitable sensing input components that may be operative to detect any suitable environmental attributes of environment E, such as the otoacoustic emissions (e.g., spontaneous otoacoustic emissions and/or evoked otoacoustic emissions) of the ears of user U1 and/or user U2, the ambient noise level or other audio qualities of environment E distinct from any sound waves emitted by sound emitting subassembly output component 112*a* and/or by sound emitting subassembly output component 112*b*, any audio qualities of environment E including any sound waves emitted by system 1 (e.g., emitted sound wave SW and/or reflected sound wave SWR or any other sound waves within environment E), and/or the like.

Auxiliary assembly 200*a* may be removably coupled to a side of housing 101 of electronic device 100 and may include an output component 212*a* that may be similar to movement output component/sound wave reflecting output component 112*c*, with or without one or more discrete movement components, such that assembly 200*a* may be operative to be positioned in any suitable manner to reflect or otherwise manipulate sound waves emitted from output component 112*b* in any suitable manner. Similarly, auxiliary assembly 200*b* may be coupled to ceiling CL and assembly 200*c* may be coupled to left wall LW and assembly 200*f* may be resting on a top surface of furniture N, each of which may be similar to movement output component/sound wave reflecting output component 112*c*, with or without one or more discrete movement components, such that each assembly may be operative to be positioned in any suitable manner to reflect or otherwise manipulate any sound waves that may reach any suitable surface(s) of the assembly.

Auxiliary assembly 200*d* may be worn by user U1 in any suitable manner, such as about the user's head, such that different portions of assembly 200*d* may physically interact with different portion of the user's head. For example, a first output component 212*b* of assembly 200*d* may be operative to be positioned adjacent user U1's left ear such that physical system attribute adjustment of output component 212*b* may physically manipulate the physical structure of user U1's left ear (e.g., based on any suitable physical system attribute adjustment data 99 from device 100, which may adjust the shape of the ear to better receive sound waves (e.g., to change the frequency response of the ear to enhance the listening experience of user U1)). Assembly 200*d* may also include a microphone input component 210*a* that may be operative to detect any suitable environmental attributes of environment E, such as the otoacoustic emissions (e.g., spontaneous otoacoustic emissions and/or evoked otoacoustic emissions) of the left ear of user U1, the ambient noise level or other audio qualities of environment E distinct from any sound waves emitted by sound emitting subassembly output component 112*a* and/or by sound emitting subassembly output component 112*b*, any audio qualities of environment E including any sound waves emitted by system 1 (e.g., emitted sound wave SW and/or reflected sound wave SWR or any other sound waves within environment E), and/or the like. Similarly a second output component 212*c* of assembly 200*d* may be operative to be positioned adjacent user U1's right ear such that physical system attribute adjustment of output component 212*c* may physically manipulate the physical structure of user U1's right ear (e.g., based on any suitable physical system attribute adjustment data 99 from device 100, which may adjust the shape of the ear to better receive sound waves (e.g., to change the frequency response of the ear to enhance the listening experience of user U1)). Assembly 200*d* may also include a microphone input component 210*b* that may be operative to detect any suitable environmental attributes of environment E, such as the otoacoustic emissions (e.g., spontaneous otoacoustic emissions and/or evoked otoacoustic emissions) of the right ear of user U1, the ambient noise level or other audio qualities of environment E distinct from any sound waves emitted by sound emitting subassembly output component 112*a* and/or by sound emitting subassembly output component 112*b*, any audio qualities of environment E including any sound waves emitted by system 1 (e.g., emitted sound wave SW and/or reflected sound wave SWR or any other sound waves within environment E), and/or the like. A third output component 212*d* of assembly 200*d* may be operative to be positioned against a back of user U1's head as a discrete movement output component such that physical system attribute adjustment of output component 212*d* may physically vibrate against the head of user U1 in a particular manner to supplement the sensation of any sensed sound waves (e.g., based on any suitable physical system attribute adjustment data 99 from device 100), which may enhance the listening experience of user U1). Assembly 200*e* may be a handheld assembly of user U1 (e.g., a smartphone) that may be operative to communicate any suitable data to device 100 (e.g., the identify of user U1, the location of user U1, the shape of each ear of user U1 (e.g., if prompted to provided such information by device 100), and/or the like.

Any one or more of assemblies 200*a*-200*f* may include any other suitable output components that may be operative to adjust any suitable physical attribute of that assembly (e.g., based on any suitable physical system attribute adjustment data 99 from device 100), such as a sound wave reflecting subassembly output component (e.g., any suitable physical or mechanical sound wave reflecting component(s) that may be operative to reflect sound waves in any suitable manner) and that may be moved in one or more directions within environment E (e.g., with respect to a sound wave emitting subassembly of device 100 and/or with respect to a user or otherwise), any suitable physical or mechanical movement output component that may be operative to be moved for adjusting any suitable physical system attribute(s) of the assembly (e.g., motors, piezoelectric actuators, etc.) and that may be embedded within or coupled to a sound wave reflecting component or any other suitable component of the assembly, and/or the like. Additionally or alternatively, each one of assemblies 200a-200f may include any suitable input component that may be operative to detect any suitable environmental attribute(s) of environment E (e.g., for providing any suitable detected environmental attribute data 91 for use by device 100).

Figure 3:
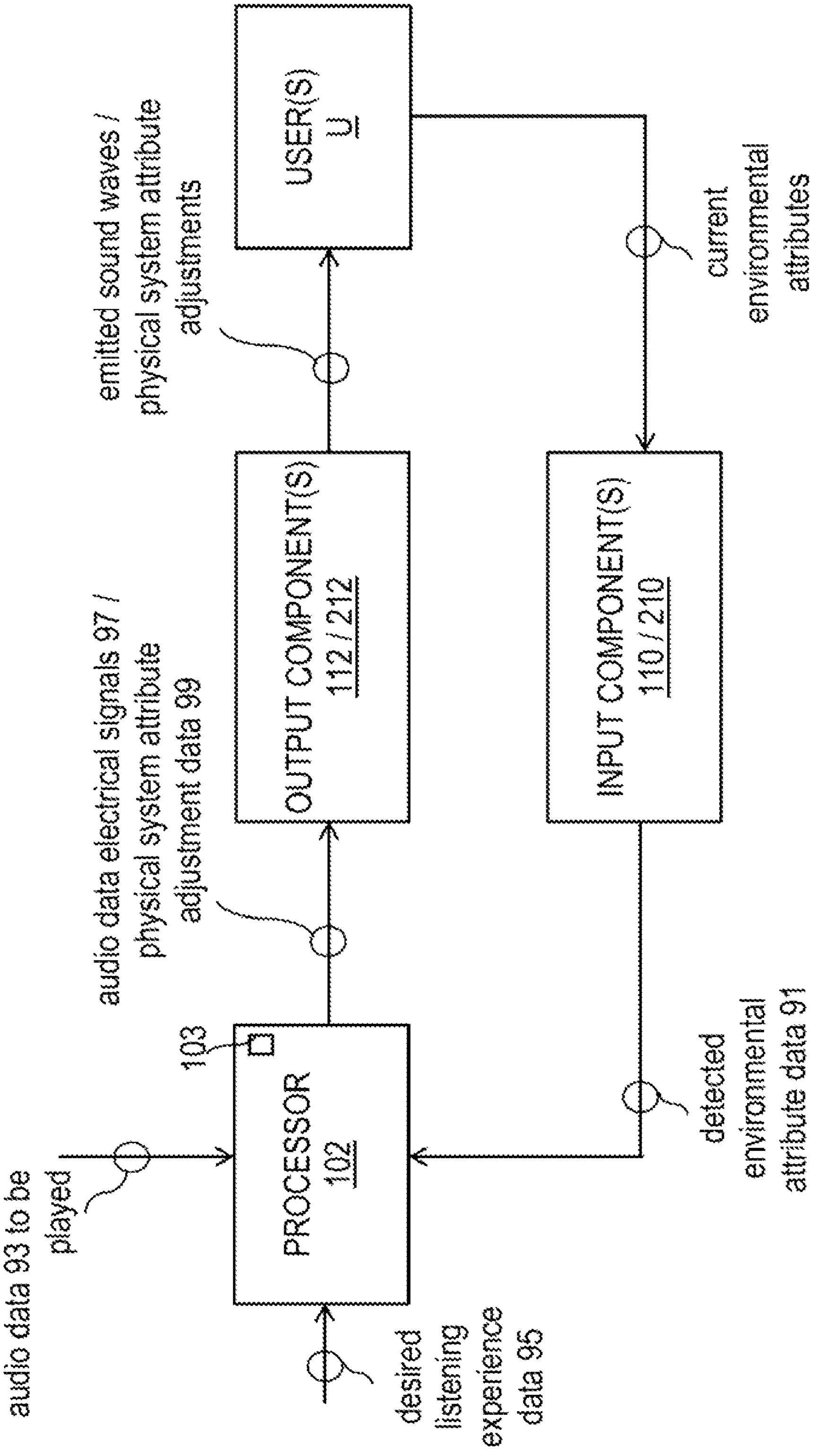
FIG. 3 is a schematic diagram of an example feedback loop of the system of FIGS. 1-2A.

Therefore, as may be illustrated in FIG. 3 by a schematic diagram 300 of an example feedback loop of system 1 of FIGS. 1-2A, processor 102 of device 100 (e.g., in conjunction with any other suitable processing of system 1 (e.g., by any processor 202 of any auxiliary assembly 200 or otherwise, which may be operative to also play back audio data therefrom)) may be operative to access audio data 93 representative of audio media to be played back by device 100 (e.g., from memory 104 or otherwise), any suitable desired (e.g., ideal) listening experience data 95 that may be indicative of preferred listening experience characteristics (e.g., for one or more particular users or for system 1 generally), such as sound wave frequency optimization, amplitude thresholds, and/or the like, and any suitable detected environment attribute data 91 (e.g., from any suitable input components 110 of device 100 and/or any suitable input components 210 of any auxiliary assembly 200 of system 1, which may include one or more current physical system attributes of any suitable components of device 100 and/or of any assembly(ies) 200) that may be indicative of the current environmental attributes of the environment of system 1. Processor 102 may be operative to process such data 91, 93, and 95 (e.g., using any suitable application 103) to generate appropriate physical system attribute adjustment data 99 that may be provided to any suitable output components 112 and/or output component 412 (e.g., to component(s) 402) of device 100 and/or to any suitable output components 212 of any auxiliary assembly 200 of system 1 for adjusting one or more physical system attributes of system 1. Processor 102 may also be operative to process such data 91, 93, and 95 (e.g., using any suitable application 103) to generate appropriate audio data electrical signals 97 that may be applied to coils 156 of sound emitting subassembly output component 112a and/or to coils of sound emitting subassembly output component 112b for emitting sound waves indicative of audio data 93 that may then be received (e.g., without reflection or after reflection) by one or more users of the environment of system 1. Then, new current environmental attributes of the environment of system 1 may be detected by input components 110/210 and provided as data 91 to processor 102 for processing in order to potentially update signals 97 and 99. Therefore, system 1 may be operative to detect various environmental attributes of the current environment of system 1 and to adjust various physical system attributes of system 1 based on the detected environmental attributes before or while a sound wave emitting subassembly of electronic device 100 emits sound waves into the environment of system 1, where such physical system attribute adjustment may enhance the experience of a system user listening to the emitted sound waves (e.g., by comparing actual environmental attributes with desired listening attributes of data 95 to reduce the error therebetween for achieving and maintaining a desired output condition). In the case of multiple users, as shown in FIG. 2, adjustments may be made to enhance the experience of each user (e.g., an adjustment of component 112b may be made to enhance the experience of user U2 while adjustment of component 112a may be made to enhance the experience of user U1).

Figure 5:
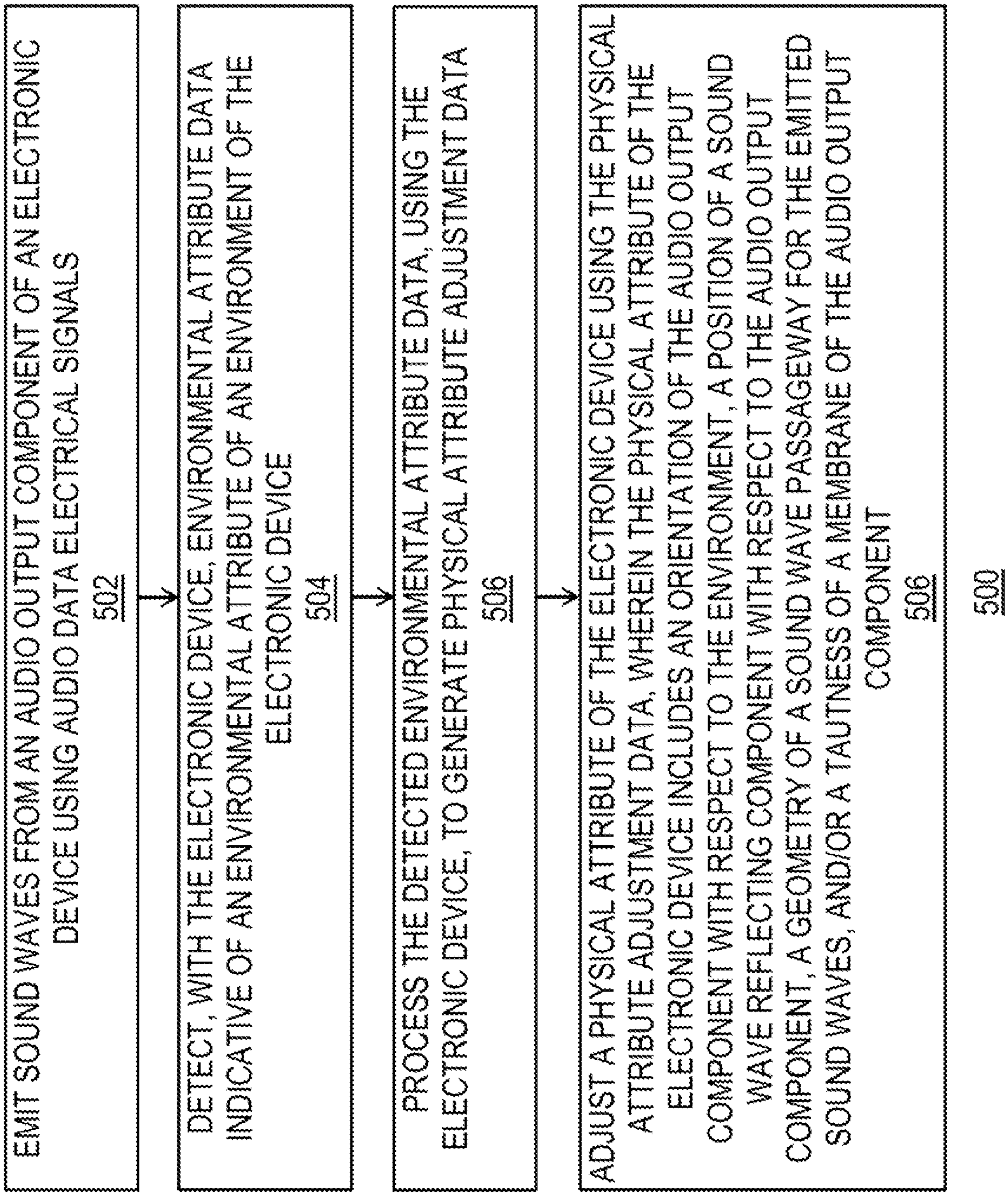
FIG. 5 is a flowchart of an illustrative process for enhancing a listening experience.

FIG. 5 is a flowchart of an illustrative process 500 for enhancing a listening experience of a user of an electronic device. At operation 502 of process 500, sound waves may be emitted waves from an audio output component of the electronic device using audio data electrical signals. At operation 504 of process 500, the electronic device may detect environmental attribute data indicative of an environmental attribute of an environment of the electronic device. At operation 506 of process 500, a physical attribute of the electronic device may be adjusted using the physical attribute adjustment data, wherein the physical attribute of the electronic device includes at least one of the following: an orientation of the audio output component with respect to the environment; a position of a sound wave reflecting component with respect to the audio output component; a geometry of a sound wave passageway for the emitted sound waves; and a tautness of a membrane of the audio output component.

It is understood that the operations shown in process 500 of FIG. 5 are only illustrative and that existing operations may be modified or omitted, additional operations may be added, and/or the order of certain operations may be altered.

Moreover, the processes described with respect to FIGS. 1-5, as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 and/or memory 204 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications component 106). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that program modules and/or various processes or operations of system 1 may be provided as a software construct, firmware construct, one or more hardware components, or a combination thereof. For example, various processes or operations or modules of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules are merely illustrative, and that the number, configuration, functionality, and interconnection of existing modules may be modified or omitted, additional modules may be added, and the interconnection of certain modules may be altered.

At least a portion of one or more of the processes or operations or modules of system 201 may be stored in or otherwise accessible to device 100 in any suitable manner (e.g., in memory 104 of device 100 or via communications component 106 of device 100 and/or in memory 204 of device 200 or via communications component 206 of device 200). Each module of system 201 may be implemented using any suitable technologies (e.g., as one or more integrated circuit devices), and different modules may or may not be identical in structure, capabilities, and operation. Any or all of the processes or operations or modules or other components of system 201 may be mounted on an expansion card, mounted directly on a system motherboard, or integrated into a system chipset component (e.g., into a "north bridge" chip). System 201 may include any amount of dedicated sound processing memory.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope. Therefore, obvious substitutions now or later known to one with ordinary skill in the art are defined to be within the scope of the defined elements. It is also to be understood that various directional and orientational terms, such as "up" and "down," "front" and "back," "exterior" and "interior," "top" and "bottom" and "side," "length" and "width" and "depth," "thickness" and "diameter" and "cross-section" and "longitudinal," "X-" and "Y-" and "Z-," and the like may be used herein only for convenience, and that no fixed or absolute directional or orientational limitations are intended by the use of these words.

What is claimed is:

1. An electronic device, comprising:

wireless communications circuitry that is configured to wirelessly receive user location information;

a speaker; and a motor that is configured to adjust the speaker based on the user location information, wherein the motor is configured to adjust a diaphragm of the speaker.

2. The electronic device defined in claim 1, wherein the motor is configured to adjust a tautness of the diaphragm of the speaker.

3. The electronic device defined in claim 1, wherein the motor is configured to move a portion of the diaphragm relative to a housing of the electronic device.

4. The electronic device defined in claim 1, wherein the motor is configured to move a sound-blocking structure that overlaps the speaker.

5. The electronic device defined in claim 1, wherein the user location information is transmitted by an auxiliary electronic device and wherein the electronic device receives information indicating a distance between the electronic device and the auxiliary electronic device.

6. The electronic device defined in claim 1, wherein the user location information is transmitted by an auxiliary electronic and wherein the electronic device receives information indicating a current state of the auxiliary electronic device.

7. The electronic device defined in claim 6, wherein the auxiliary electronic device comprises a cellular telephone.

8. The electronic device defined in claim 6 wherein the electronic device receives a geometry of an environment from the auxiliary electronic device.

9. The electronic device defined in claim 6 wherein the electronic device receives user identity information from the auxiliary electronic device.

10. The electronic device defined in claim 6 wherein the electronic device receives ear geometry information from the auxiliary electronic device.

11. An electronic device, comprising:

wireless communications circuitry that wirelessly receives transmitted user location information;

a display;

a speaker that emits sound waves in a first direction; and a motor, wherein the motor is configured to adjust a position of the display relative to the speaker based on the user location information.

12. The electronic device defined in claim 11, wherein the speaker is mounted in a housing of the electronic device and wherein the motor is configured to move a structure of the electronic device that is mounted outside the housing.

13. The electronic device defined in claim 11, wherein the wireless communications circuitry wirelessly receives distance information indicating a distance between the electronic device and an auxiliary electronic device.

14. The electronic device defined in claim 13, wherein the user location information is transmitted by the auxiliary electronic device.

15. An electronic device, comprising:

wireless communications circuitry that wirelessly receives transmitted user location information;

a speaker that emits sound waves in a first direction; and a motor, wherein the motor is configured to adjust the speaker to emit the sound waves in a second direction based on the user location information and wherein the motor is configured to adjust a tautness of a membrane of the speaker.

16. An electronic device, comprising:

a housing;

a speaker that emits sound waves, wherein the speaker is mounted in the housing;

wireless communications circuitry that receives information indicating a user location; and a discrete movement structure that moves based on the user location, wherein the discrete movement structure is coupled to a display and is configured to move the display relative to the speaker.

17. The electronic device defined in claim 16, wherein the discrete movement structure moves by rotating about a hinge structure.

18. The electronic device defined in claim 16, wherein the discrete movement structure moves along a first axis.

19. The electronic device defined in claim 18, wherein the discrete movement structure moves along a second axis that extends at a non-zero angle to the first axis.

* * * * *